United States Patent [19]
Weber

[11] Patent Number: 4,590,981
[45] Date of Patent: May 27, 1986

[54] CAST BRAKE CROWN ROTOR AND METHOD OF PRODUCING SAME

[75] Inventor: André Weber, Saverne, France

[73] Assignee: Kuhn S.A., Saverne, France

[21] Appl. No.: 561,803

[22] Filed: Dec. 15, 1983

[30] Foreign Application Priority Data

Dec. 23, 1982 [FR] France .................. 82 21789

[51] Int. Cl.⁴ ............................................. B22D 19/00
[52] U.S. Cl. ............................. 164/112; 164/98; 164/105; 164/332
[58] Field of Search ............... 164/15, 69.1, 70.1, 164/98, 133, 244, 349, 362, 363, 99-105, 112, 332, 364; 249/83, 87; 264/241

[56] References Cited

U.S. PATENT DOCUMENTS 2,218,810 10/1940 Campbell et al. .................. 164/98
3,421,573 1/1969 Groteke et al. .................. 164/362

FOREIGN PATENT DOCUMENTS 1004468 3/1952 France .
2058643 5/1971 France .
2395795 1/1979 France .
387933 2/1933 United Kingdom .

Primary Examiner—Nicholas P. Godici
Assistant Examiner—Richard K. Seidel
Attorney, Agent, or Firm—Marmorek, Guttman & Rubenstein

[57] ABSTRACT

A brake crown rotor is produced by casting in a mold the substantially cylindrical cast metal crown, and fusing to the upper portion thereof the outer perimeter of a round prefabricated sheet metal cover, the fusion taking place in the mold.

14 Claims, 5 Drawing Figures

CAST BRAKE CROWN ROTOR AND METHOD OF PRODUCING SAME

BACKGROUND OF THE INVENTION

The invention relates to the art of casting, and relates more particularly to the manufacture of a brake crown rotor that includes the casting of the brake crown thereof.

More particularly, the invention relates to the casting of a brake crown and simultaneous connection thereto of a prefabricated sheet metal cover.

Still more particularly, the invention relates to the foregoing method as well as to the brake crown rotor thus produced.

SUMMARY OF THE INVENTION

One of the principal objects of the invention is to provide a brake crown and to connect it to a prefabricated cover, the connection being sound and performed at low cost.

It is a further object of the invention to provide a method for producing such a brake crown rotor that is composed of a brake crown and its cover, and to provide for a mold that renders such a production possible.

It is a still further object to provide for interconnection between the cover, which, for instance, may be made of stamped sheet metal, with the cast crown, which may be made by casting it from cast iron, and to provide for the interconnection by fusing, such as welding, between the outer perimeter of the crown cover and the upper section of the normally uprightly disposed cast iron crown, and to render the connection substantially free from any defect.

It is a still further object of this invention to provide such a brake crown rotor in such a manner as to facilitate the subsequent manufacturing stages to which the brake crown rotor needs to be subjected before it can be mounted on a vehicle.

It is moreover an object of the instant invention to provide such a brake crown rotor in which the crown has substantially throughout a constant hardness.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel methods, construction, arrangement and combination of various devices, elements and parts, as set forth in the claims hereof, certain embodiments of the same being illustrated in the accompanying drawings and described in this specification.

BRIEF DESCRIPTION OF THE DRAWINGS

For a fuller understanding of the nature and objects of the instant invention, reference should be had to the following detailed description, particularly in connection with the accompanying drawings, in which.

DESCRIPTION OF THE PREFERRED EMBODIMENTS

Figure 1:
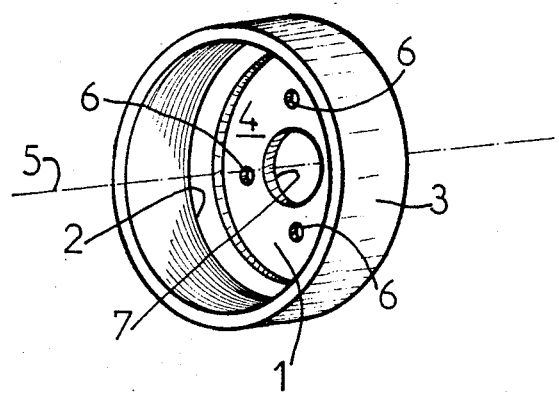
FIG. 1 is a perspective view of a brake crown rotor produced in accordance with the instant process.
Figure 2:
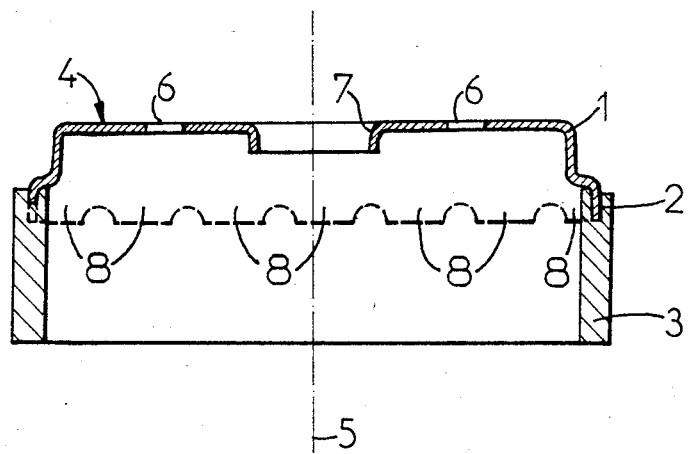
FIG. 2 is a large-scale diametrical sectional view of the brake crown rotor shown in FIG. 1.

In carrying the invention into effect, in the embodiments which have been selected for illustration in the accompanying drawings and for description in this specification, and referring now particularly to FIGS. 1 and 2, there is provided a brake crown rotor that includes a cover 1 that has an outer perimeter 2 with which the cover 1 is secured to a brake crown 3.

Figure 4:
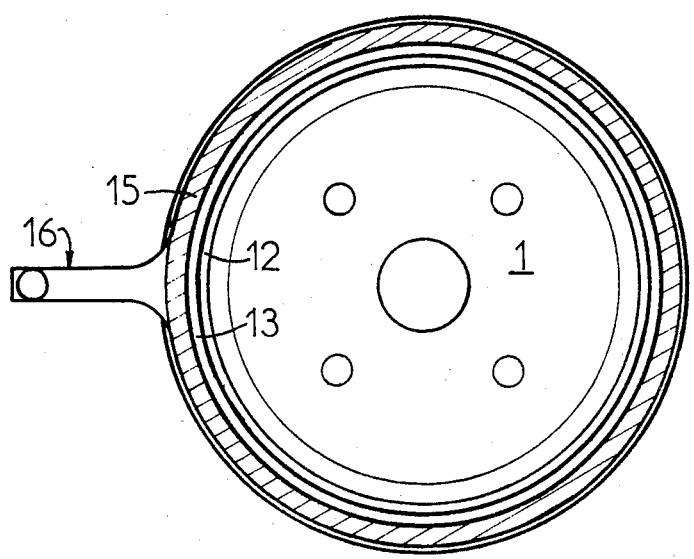
FIG. 4 is a plan view, partly in section, of the mold of FIG. 3, the upper section of the mold, however, havng been removed.

The cover 1, as shown in FIGS. 1, 2 and 4, has a circular shape. It is made of metal and, preferably, of a single piece of stamped sheet steel. The cover 1 includes in its surface perpendicular to the central axis 5 a certain number of holes 6; the holes 6 serve to assemble the rotor on the hub of a wheel, for example of a vehicle (not shown); the cover 1 also has a central passage 7 for the shaft of such a vehicle hub.

As shown in FIG. 2, the outer perimeter of the cover 1 has a plurality of tongues 8. The tongues 8 serve to increase the strength of interconnection between the cover 1 and the crown 3.

The crown 3 is substantially in the form of a cylinder and is made of cast metal, such as, for example, cast iron.

Figure 3:
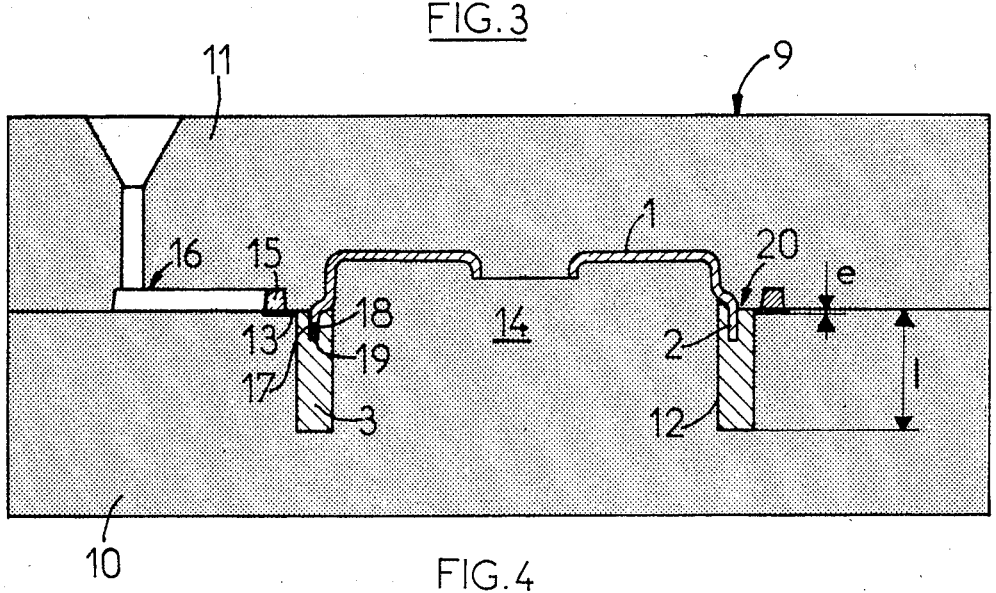
FIG. 3 is a diametrical sectional view of a mold shown in FIG. 4.

As shown in FIG. 3, during the casting operation, the crown 3 is shown in an upright position. This upright position is advantageous where the liquid cast metal is fed by gravity, as is assumed in FIG. 3.

This invention, however, is not restricted to such gravity feeding, as other methods of feeding the liquid cast metal conceivably may apply. Therefore, the terms upright, upper, lower, height, and similar terms are not intended to be understood in any limiting sense, but are used only for the purpose of clarity in describing the instant invention in connection with the specific embodiments shown in the drawings hereof. When later on the brake crown rotor is applied to the hub of a vehicle wheel, the axis 5 thereof will in most instances be in a position other than upright.

Turning now to the casting process, particularly as shown in FIGS. 3 and 4, there is provided a mold 9 (FIG. 3) that includes a lower section 10 and an upper section 11. In the lower section 10 there is defined a cavity 12 which, in the embodiment shown, is cylindrical (FIG. 4), and will permit casting therein of the crown 3. Furthermore, the lower section 10 defines a flow channel 13. Moreover, the lower section 10 includes a support 14 which substantially has a circular shape complementary to a major portion of the interior of the circular cover 1, so that it permits mounting of the cover 1 on the support 14, so that the cover 1 will be centered coaxially with the cavity 12 and the outer perimeter 2 of the cover 1 will extend into the cavity 12, and will be held suspended in that position upon closing of the mold 9 by the upper section 11.

The upper mold section 11 has a recess of a shape that substantially complements the shape of a major portion of the exterior of the cover 1. Thus, when the mold 9 is closed, the major portions of the cover 1 will be held immovable. The upper mold section 11 furthermore defines a distribution canal 15 that intercommunicates with the flow channel 13, as well as a feeding system 16 upstream of the distribution canal 15 and that intercommunicates with the distribution canal 15; so that liquid casting metal, such as cast iron can flow through the feeding system 16 into the distribution canal 15 and thence into the flow channel 13, to flow therefrom into the cavity 12.

The flow channel 13 has the form of an annular disk of a height "e" which is relatively small in relation to the height "l" of the drum 3. The small height "e" of the flow channel 13 ranges between 0.5 and 3 millimeters, and preferably is about one millimeter.

The flow channel 13 extends into the zone of the outer perimeter 2 of the cover 1 when the cover 1 is held in the position shown in FIG. 3 during casting; and, upon casting, there will occur a type of fusion, such as welding, between a portion of the cover 1 and the crown 3. Furthermore, the flow channel 13 is arranged in such a manner that the wave of cast iron arriving in the cavity 12 will have a substantially horizontal direction.

Both the flow channel 13 and the distribution canal 15 have annular shapes, surrounding the upper end portion of the cavity 12.

Thus, considering the low height "e" of the flow channel 13 and the positioning of said flow channel 13, and the pressure which exists during the casting, in the stream of the liquid cast iron, the liquid iron will reach the cavity 12 in a substantially horizontal direction as indicated hereabove, and it will have a certain speed, which permits it to strike the outer perimeter 2 of the cover 1 in the cavity 12. With such contact, the temperature of the outer perimeter 2 of the cover 1 will rise.

It is, however, not necessary that the flow channel 13 be so positioned that the cast iron strikes the cover 1. In that case, heating will be produced during the passage of the cast iron near the outer periphery 2 of the cover 1.

When the level of the cast iron in the cavity 12 reaches the outer perimeter 2 of the cover 1, the exterior surface 17 (FIG. 3) and/or interior surface 18 of the outer perimeter 2 will have a temperature such that the metal of these surfaces will substantially begin to smelt while the core 19 of that outer perimeter 2 remains solid. In this case, the fusion, like welding, between the cast iron of the crown 3 and the metal of the cover 1 will take place without any major change in the resistance characteristics of the cover 1. There is thus minimized the risk of any break occurring in the cover 1 near the upper end portion of the crown 3 as cast in the cavity 12. To realize this, however, one must adapt the temperature of the liquid cast iron to the flow and speed of filling of the mold 9.

To improve the fusion, like welding, between the outer perimeter of the cover 1 and the crown 3, it is advantageous to remove any grease from the cover 1 and/or to shot it prior to the commencement of casting.

To fill the cavity 12 relatively uniformly with the casting iron, it is advantageous that the cross-sectional area of the flow channel 13 that is adjacent the cavity 12 be relatively smaller than the cross-sectional area of the feeding system 16 that is adjacent the distribution canal 15.

Thus, the flow channel 13 forms a sort of choke in such a way that the cast iron first fills the distribution canal 15 before flowing uniformly into the cavity 12.

In FIG. 4 it can be observed that the flow channel 13 and the distribution canal 15 extend all around the cavity 12. This arrangement guarantees uniformity of feeding of the cavity 12. As shown in FIGS. 3 and 4, the distribution canal 15 is located at a certain radial distance from the cavity 12. This special arrangement is due to the thickness of the sand ring 20 that is disposed between the distribution canal 15 and the cover 1, which thickness is necessary to prevent crumbling of the sand ring 20 during the closing of the mold 9, or during the flow of the liquid casting metal.

Figure 5:
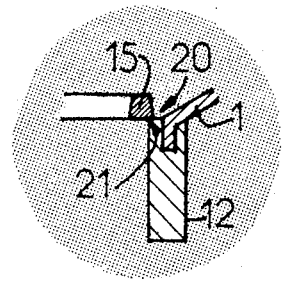
FIG. 5 is a fragmentary sectional view, similar to a part of FIG. 3, but embodying a modification.

As shown in the modification of FIG. 5, however, it is possible when the shape of the cover 1 permits it, to reduce the distance between the distribution canal 15 and the cavity 12 to a small size, even to zero. In this latter case, the flow channel will be reduced to a simple choke 21 between the distribution canal 15 and the cavity 12, the cross-sectional area of which will substantially be the same as the cross-sectional area of communication between the aforesaid flow channel 13 and the cavity 12.

Certain of the advantages of the invention have already been referred to herein. It may be useful, however, to alude particularly at this time to a major advantage, namely, the type of fusion, like welding, which will occur betwen the outer perimeter 2 of the cover 1 and the cast iron of the crown 3. This fusion will take place substantially throughout the entire circumference of the outer perimeter 2, as well as throughout the upper portion of the crown 3 within the cavity 12.

A further advantage is that with this process there is obtained a crown 3, the material of which has substantially constant hardness throughout substantially its entire outer and inner cylindrical surfaces. This hardness will be different only in the zone of the flow channel 13. If the small height "e" of the flow channel 13 is borne is mind, however, this zone is relatively small as compared to the height "l" of the crown 3.

This appreciable constancy of the hardness of the material of the crown 3 will facilitate the subsequent machining of the crown, rendering it possible to observe close tolerances of manufacture, and to reduce geometrical faults of the brake crown rotor. Thus, overall savings may be realized.

Moreover, as the flow channel 13 surrounds in close vicinity the outer perimeter of the cover 1, the cast iron as it penetrates the cavity 12 will, as stated earlier, heat the outer perimeter 2 of the cover so that at the end of the filling of the cavity 12 when the fusion between the cover 1 and the crown 3 takes place, the elevated temperature of the exterior and/or interior surfaces of the outer perimeter 2 will promote this fusion and will contribute to the formation of a secure rigid connection between the cover 1 and the crown 3.

The small height "e" of the flow channel 13, on the other hand, will bring about that the cast iron which remains in the flow channel 13 after the cavity 12 has been filed, will rapidly cool and will become hard. This hardness, on the other hand, makes the cast iron very brittle and can advantageously be utilized for separating the crown 3 from the flow channel 13. In fact, a light shock or simple vibration will suffice to detach the flow channel 13 by itself substantially/exactly at the upper level of the crown 3. Thus, there is rendered superfluous any need for subsequent trimming, resulting in further savings of costs.

The rapid cooling of that portion of the cast iron that remains in the flow channel 13, on the other hand, will prevent any return flow of the still liquid cast iron from the cavity 12 into the distribution canal 15 and into the feeding system 16 so preventing formation of pipes in the cast iron of the crown 3. As previously indicated, at the time of the flow the cast iron will rapidly fill the distribution canal 15 before flowing into the flow channel 13 and thence into the cavity 12. The advantage of this arrangement is that it guarantees an appreciably uniform filling at each point of the circumference of the cavity 12 in the zone of the outer perimeter 2 of the cover 1 and, consequently, brings about a regular heating of the outer perimeter 2, thus contributing to a good connection between the cover 1 and the crown 3.

OPERATION

The operation of the above described embodiment of the invention is as follows:

The cover 1 will be prefabricated and shaped as shown in FIGS. 1 and 2.

Therafter, the cover 1 will be placed in the mold 9 shown in FIG. 3, with its outer perimeter being suspended in the upper portion of the cavity 12.

With the upper section 11 of the mold 9 placed onto the lower section 10, the cover 1 will throughout its major part be held immovably.

Therafter, the cast iron is poured through the feeding system 16 from where it will flow into the distribution canal 15 and from there into the flow channel 13 and thence into the cavity 12. During that flow, the outer perimeter 2 of the cover 1 will be heated, as explained herein above.

When the casting in the cavity 12 solidifies to become the crown 3, the upper portion of the crown 3 will be fused, substantially throughout the circumference, to the outer perimeter 2 of the sheet metal cover 1.

I wish it to be understood that I do not desire to be limited to the exact details of constructions and processes shown and described, for obvious modifications will occur to a person skilled in the art.

Having thus described the invention, what I claim as new and desire to be secured by Letters Patent is as follows:

1. In a process of producing, with the aid of a mold, a brake crown rotor having a substantially cylindrical cast metal crown and a round prefabricated sheet metal cover connected at its outer perimeter to said crown so that said cast metal crown surrounds said outer perimeter, said mold defining an annular cavity corresponding in form to said crown, and including a choke-forming flow channel operable to feed the liquid casting material into said cavity,
    the steps comprising,
    arranging said flow channel so that its height be relatively small, and so that it extends into the vicinity of the upper portion of said cavity, and substantially all around said cavity,
    mounting said cover such that its outer perimeter extends into said upper portion of said cavity in the vicinity of which said flow channel is disposed, and
    pouring liquid casting material into said cavity,
    whereby the crown will be cast in said cavity, and the cover will be interconnected with said crown substantially throughout the outer perimeter of said cover.

2. In a process, as claimed in claim 1, said mold further including a distribution canal,
    the steps comprising,
    arranging said distribution canal so that it extends substantially all around said cavity, and
    pouring the casting material from said distribution canal through said flow channel into said cavity.

3. In a process as claimed in claim 2, said mold further including a feeding system that feeds the liquid casting material into the distribution canal,
    the step comprising,
    arranging the cross-sectional area of said flow channel adjacent said cavity to be relatively smaller than the cross-sectional area of the feeding system adjacent said distribution canal.

4. In a process, as claimed in claim 2,
    the step comprising,
    arranging said distribution canal for the liquid casting material all around said cavity.

5. In a process, as claimed in claim 1,
    the step comprising,
    arranging the height of the flow channel to be between 0.5 and 3 millimeters.

6. In a process, as claimed in claim 1,
    the step comprising,
    arranging the height of the flow channel to be about one millimeter.

7. In a process, as claimed in claim 1 said flow channel being so arranged relative to said cavity that the stream of liquid casting material will pour into said cavity substantially horizontally.

8. In a process, as claimed in claim 1, the pouring of the liquid casting material being carried out in such a manner that the stream of the liquid casting material will strike the outer perimeter of said cover.

9. In a process, as claimed in claim 1, the liquid casting material being fed into the cavity in such a way that the stream of the liquid casting material will pass in the proximity of the outer perimeter of said cover.

10. In a process, as claimed in claim 1, the temperature of the outer perimeter of said cover during casting rising in such a manner that either annular surface of said perimeter will begin to smelt while the core of said perimeter remains solid.

11. In a process, as claimed in claim 1, said mold including a distribution canal, and said flow channel being arranged as a choke disposed between said distribution canal and said cavity,
    wherein said pouring step comprises,
    pouring said liquid casting material from said distribution canal through said choke into said cavity.

12. In a process, as claimed in claim 11,
    the step comprising,
    arranging said choke about said cavity.

13. In a process, as claimed in claim 1,
    the step comprising,
    arranging said flow channel about the cavity.

14. A mold, for use in producing a brake crown rotor having a susbstantially cylindrical cast metal crown and a prefabricated sheet metal cover connected at the outer perimeter to said crown, so that said cast metal crown surrounds said outer perimeter of said sheet metal cover,
    comprising in combination,
    an upper mold section and a lower mold section,
    said mold defining:
    (a) an annular cavity means for casting therein said brake crown,
    (b) a flow channel means of relatively small height substantially surrounding said cavity means and communicating with the upper end portion of said cavity means,
    (c) a distribution canal means intercommunicating with said flow channel means for pouring liquid casting material through said flow channel means into said cavity means,
(d) means operable for feeding liquid casting material into said distribution canal means, and
(e) means shaped for supporting said prefabricated cover in such a position that during casting of the crown the outer perimeter of said cover will extend into the upper end portion of said cavity means.

* * * * *